US005670678A

United States Patent [19]
Rothbart

[11] Patent Number: 5,670,678
[45] Date of Patent: Sep. 23, 1997

[54] METHOD FOR RECOVERING EDIBLE OIL FROM ADSORBENT MATERIALS

[75] Inventor: Michael A. Rothbart, Fullerton, Calif.

[73] Assignee: Hunt-Wesson, Inc., Fullerton, Calif.

[21] Appl. No.: 426,281

[22] Filed: Apr. 21, 1995

[51] Int. Cl.⁶ ........................................................ C11B 3/10
[52] U.S. Cl. .......................................................... 554/191
[58] Field of Search ............................................ 554/191

[56] References Cited

U.S. PATENT DOCUMENTS

| | | |
|---|---|---|
| 1,633,871 | 6/1927 | Prutzman . |
| 1,802,533 | 4/1931 | Reid . |
| 1,851,627 | 3/1932 | Hartley . |
| 2,288,441 | 6/1942 | Ewing . |
| 2,509,509 | 5/1950 | Leaders et al. . |
| 2,548,434 | 4/1951 | Leaders . |
| 2,560,935 | 7/1951 | Dickinson . |
| 2,577,079 | 12/1951 | Gee . |
| 2,586,947 | 2/1952 | Hays, Jr. et al. . |
| 2,682,551 | 6/1954 | Miller . |
| 3,939,281 | 2/1976 | Schwengers . |
| 4,285,832 | 8/1981 | Orth, Jr. . |
| 4,331,695 | 5/1982 | Zosel . |
| 4,675,198 | 6/1987 | Sevenants . |
| 4,816,189 | 3/1989 | Rothbart et al. . |
| 5,011,594 | 4/1991 | Haeffner et al. . |
| 5,041,245 | 8/1991 | Benado . |
| 5,092,983 | 3/1992 | Eppig et al. . |
| 5,210,240 | 5/1993 | Peter et al. . |
| 5,256,613 | 10/1993 | Maes et al. . |
| 5,281,732 | 1/1994 | Franke . |

FOREIGN PATENT DOCUMENTS

| | | |
|---|---|---|
| 231126 | 4/1925 | United Kingdom . |
| 567573 | 2/1945 | United Kingdom . |

*Primary Examiner*—José G. Dees
*Assistant Examiner*—Deborah D. Carr
*Attorney, Agent, or Firm*—Pretty, Schroeder & Poplawski

[57] ABSTRACT

Disclosed is a process for recovering an edible oil, such as soybean or canola oil, from an adsorbent material, such as a bleaching agent, by contacting a feed of the adsorbent material containing the edible oil with a normally gaseous solvent, such as liquid propane, for a time sufficient to extract a substantial portion of the oil from the adsorbent material, before the oil degrades to an appreciable extent.

16 Claims, No Drawings

METHOD FOR RECOVERING EDIBLE OIL FROM ADSORBENT MATERIALS

BACKGROUND OF THE INVENTION

1. Field of the Invention

This invention relates to the chemical arts. In particular, it relates to a method for recovering edible oil from adsorbent materials, such as spent bleaching agents.

2. Discussion of the Related Art

In the refining of edible oils, it is common practice to treat the oil with an adsorbent material, including bleaching agents, such as clay or activated carbon, to decolor and purify the oil. The adsorbent material is a granular or powdered, porous solid having a large surface area which attracts and holds color bodies, gums, oxidized oil and other undesirable components present in the untreated oil. When the adsorbent material is subsequently removed from the oil, the impurities are also removed from the oil.

In particular, edible oils used in high temperature applications, such as for frying foods, must be specially refined to remove all color and odor-forming impurities. An important step in these processes is treatment with an adsorbent material. U.S. Pat. No. 4,816,189 to Michael A. Rothbart (which is herein incorporated by reference) describes an effective method for refining and stabilizing edible, frying oils. The patent discloses a close-coupled process that begins by treating unrefined, unbleached oil with a caustic agent, then heating and water washing the treated oil, and degassing the oil. Next, a finely divided adsorbent material is dispersed in the degassed oil and the dispersion is heated in a carbon dioxide atmosphere. Finally, the oil is again degassed, filtered to remove the spent adsorbent material and then cooled.

Unfortunately, there are numerous drawbacks to the use of an adsorbent material in this and in related processes. One drawback arises because the spent adsorbent material contains significant amounts of oil, thus reducing the percent recovery of refined oil. For example, when the adsorbent is separated from the oil by filtration, it contains up to about 50% residual oil.

Another problem arises, because of the difficulty in disposing of the material. Most commonly, the spent adsorbent material must be transported to a land-fill. This is increasingly problematical as the number of landfills decreases and the costs of using landfills rise. And since the costs are often tied into the weight and volume of the matter to be disposed, the presence of absorbed oil has a significant adverse impact on the cost of disposal.

The disposal problem is exacerbated, because oil-containing adsorbent material is pyrophoric. Consequently, it must be sprayed with water and/or spread into a thin layer at the landfill to minimize the danger of spontaneous combustion. These added steps increase the cost of disposal, thus increasing the cost of the refined and bleached oil.

Accordingly, there has existed a definite need for a process to recover oil from spent adsorbent material. There has existed a further need for a selective extraction process that not only recovers absorbed oil, but that recovers absorbed oil that has not been degraded and does not contain color bodies, gums and other impurities. There has existed a still further need for a process for treating spent adsorbent material, to minimize the expense of its disposal. The present invention satisfies these and other needs and provides further related advantages.

SUMMARY OF THE INVENTION

In the method in accordance with the invention, an undegraded edible oil is recovered from an adsorbent material by contacting a feed of adsorbent material containing the edible oil with a normally gaseous solvent, for a time sufficient to extract a substantial portion of the oil from the adsorbent material, before the oil degrades to an appreciable extent. The ratio of feed to solvent is from about 1:1 to about 1:3 and the solvent is maintained at a temperature and at a pressure at which it is a liquid. Next, the oil-containing solvent is separated from the oil-reduced adsorbent material to recover the oil-reduced adsorbent material and then the oil is separated from the solvent to recover substantially undegraded oil. In a preferred embodiment, soybean or canola oil is extracted from acid-activated clay using liquid propane maintained at a pressure of from about 650 psi to about 850 psi and at a temperature of from about 110° F. to about 150° F. and the ratio of the feed to propane is from about 1:1.5 to about 1:2.

DETAILED DESCRIPTION OF THE PREFERRED EMBODIMENTS

The method in accordance with the invention is useful in recovering any type of edible oil, that has been treated with an adsorbent material. Representative edible oils include vegetable oils, such as soybean oil, canola oil, corn oil, cottonseed oil, olive oil, peanut oil and mixtures thereof. The method has been found particularly effective in recovering canola and soybean oils.

The adsorbent material is any adsorbent material useful in treating edible oils. By adsorbent material is meant a granular or powdered, porous solid material having a relatively large surface area used to trap color and other adsorbable impurities contained in unrefined and unbleached vegetable oils. Adsorbent materials are known in the art. They include bleaching agents, such as activated carbon and neutral and acid activated clays, e.g., montmorillonite, bentonite, attapulgite and Fuller's earth.

The solvent used to extract the oil is any solvent that is normally gaseous, i.e., has a boiling point substantially below room temperature, and that is compatible with the edible oil. Preferred normally gaseous solvents include low molecular weight hydrocarbons, with propane (boiling point at atmospheric pressure of $-38°$ F.) and butane (boiling point at atmospheric pressure of $34°$ F.) most preferred.

It is a distinct advantage of the method in accordance with the invention that the oil that is recovered is not substantially degraded. Instead, the oil is of bleached oil quality and needs only to be deodorized to produce a high-quality, refined oil. It is important, therefore, that the oil recovery begins before the oil has degraded to any substantial extent. This is particularly significant when the adsorbent material is an acid activated catalyst, such as acid activated clay. It is believed the acid rapidly catalyzes the polymerization and/or autoxidation of the oil and, thus, quickly causes its degradation. So, when oil recovery follows refining with an acid activated catalyst, the oil recovery should begin within 60 minutes, preferably within 10 minutes, of the separation of the refined oil from the spent catalyst.

In the first step, the oil-containing spent adsorbent material is fed to an extraction chamber where it is contacted with the normally gaseous solvent, while maintaining the solvent at temperature and at a pressure at which the solvent is a liquid. It is another benefit step of the method in accordance with the invention, that the solvent can be maintained as a liquid under subcritical conditions. For example, in those embodiments where the solvent is propane, the propane is preferably maintained at a pressure of from about 350 psi to about 3000 psi and at a temperature of from about 100° F. to about 175° F., more preferably at a pressure of from about 650 psi to about 850 psi and at a temperature of from about 110° F. to about 150° F., and most preferably at a pressure of about 750 psi and at a temperature of about 125° F.

The ratio of feed to solvent is preferably from about 1:1 to about 1:3 and more preferably from about 1:1.5 to about 1:2. The spent adsorbent material is contacted with the normally gaseous solvent for a time sufficient to extract a substantial portion of the oil. When the normally gaseous solvent is propane the time is generally from about twenty minutes to about one-hour.

The oil-containing solvent is then separated from the oil-reduced bleaching material to recover the oil-reduced adsorbent material. In some embodiments, the adsorbent material is freed of residual solvent by reducing the pressure in at least two stages while heating.

Finally the oil is separated from the solvent. In some embodiments, the oil-containing solvent is removed from the extraction chamber and then subjected to a phase separation by isothermal expansion, i.e., by maintaining its temperature while decreasing its pressure to recover a gaseous solvent phase containing a small amount of oil which can be reused as solvent and a liquid oil-enriched phase that can be freed of solvent by controlled volatilization. It is a major advantage of the process in accordance with the invention that it results in a selective extraction of the adsorbent matter. Not only is the oil not degraded to any significant extent, but it is substantially free of color bodies and other impurities which remain trapped in the adsorbent after extraction.

It is still another significant advantage of the process in accordance with the invention that it results in the recovery of at least 75% and, more typically, at least 90% of the oil initially entrapped by the adsorbent material. Further, the process reduces weight and volume of the treated adsorbent material to be disposed, by up to 40%.

I claim:

1. A process for selectively recovering soybean oil free from color bodies and/or other adsorbed impurities from acid activated clay containing soybean oil, color bodies and/or other adsorbed impurities comprising the steps of:

selectively extracting soybean oil from a feed of acid activated clay containing soybean oil, color bodies and/or other adsorbed impurities by contacting the activated clay with propane, where the ratio of the feed to propane is from about 1:1.5 to about 1:2, while maintaining the solvent at a pressure of from about 650 to about 850 psi and at a temperature of from about 110° to about 150° F., for a time sufficient to selectively extract a substantial portion of the soybean oil from the activated clay and color bodies and/or other adsorbed impurities, before the soybean oil degrades to an appreciable extent, separating the soybean oil-containing propane from the activated clay and the color bodies and/or other adsorbed impurities, to recover the oil-reduced activated clay, and then separating the soybean oil from the propane to recover substantially undegraded soybean oil free from color bodies and other adsorbed impurities.

2. A process for selectively recovering an edible oil free from color bodies and/or other adsorbed impurities from an adsorbent material containing edible oil, color bodies and/or other adsorbed impurities comprising the steps of:

selectively extracting an edible oil from a feed of adsorbent material containing the edible oil, color bodies and/or other adsorbed impurities by contacting the adsorbent material with a normally gaseous solvent, where the ratio of feed to solvent is from about 1:1 to about 1:3, while maintaining the solvent at a temperature and at a pressure at which the solvent is a liquid, for a time sufficient to selectively extract a substantial portion of the oil from the adsorbent material and color bodies and/or other adsorbed impurities before the oil degrades to an appreciable extent, separating the oil-containing solvent from the oil-reduced adsorbent material and the color bodies and/or other adsorbed impurities, to recover the oil-reduced adsorbent material, and then separating the oil from the solvent to recover substantially undegraded oil free from color bodies and other adsorbed impurities.

3. The process in accordance with claim 1, wherein the normally gaseous solvent is a low molecular weight hydrocarbon.

4. The process in accordance with claim 2, wherein the normally gaseous solvent is propane or butane.

5. The process in accordance with claim 2, wherein the normally gaseous solvent is propane.

6. The process in accordance with claim 3, wherein the ratio of feed to solvent is from about 1:1.5 to about 1:2.

7. The process in accordance with claim 4, wherein the ratio of feed to solvent is from about 1:1.5 to about 1:2.

8. The process in accordance with claim 4, wherein the propane is maintained at a pressure of from about 350 psi to about 3000 psi and at a temperature of from about 100° F. to about 175° F.

9. The process in accordance with claim 7, wherein the propane is maintained at a pressure of from about 650 psi to about 850 psi and at a temperature of from about 110° F. to about 150° F.

10. The process in accordance with claim 8, wherein the propane is maintained at a pressure of about 750 psi and at a temperature of about 125° F.

11. The process in accordance with claim 3, wherein the adsorbent material is neutral clay, acid activated clay or activated carbon.

12. The process in accordance with claim 10, wherein the bleaching material is acid activated clay.

13. The process in accordance with claim 3, wherein the edible oil is selected from soybean oil, corn oil, cottonseed oil, canola oil, olive oil, peanut oil and mixtures thereof.

14. The process in accordance with claim 12, wherein the edible oil is soybean oil or canola oil.

15. The process in accordance with claim 3, wherein at least about 75% of the oil initially contained in the adsorbent material is recovered.

16. The process in accordance with claim 3, wherein at least about 90% of the oil initially contained in the adsorbent material is recovered.

* * * * *